(12) United States Patent
Han et al.

(10) Patent No.: US 6,992,777 B2
(45) Date of Patent: Jan. 31, 2006

(54) BIREFRINGENT MACH-ZEHNDER INTERFEROMETER

(75) Inventors: Xiaofeng Han, Allentown, PA (US); Boying Barry Zhang, Lawrenceville, NJ (US); Zhicheng Yang, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 228 days.

(21) Appl. No.: 10/010,646

(22) Filed: Nov. 13, 2001

(65) Prior Publication Data

US 2003/0090673 A1 May 15, 2003

(51) Int. Cl.
*G01B 9/02* (2006.01)
(52) U.S. Cl. ...................... 356/491; 356/517; 356/453
(58) Field of Classification Search ............... 356/517, 356/491, 450, 453
See application file for complete search history.

(56) References Cited

U.S. PATENT DOCUMENTS

| | | | | |
|---|---|---|---|---|
| 4,165,937 A | * | 8/1979 | Murayama et al. | 356/319 |
| 4,480,916 A | * | 11/1984 | Bareket et al. | 356/495 |
| 5,675,411 A | * | 10/1997 | Brooks et al. | 356/328 |
| 6,341,015 B2 | * | 1/2002 | Shirley | 356/517 |
| 6,459,487 B1 | * | 10/2002 | Chen et al. | 356/491 |

* cited by examiner

*Primary Examiner*—Hwa (Andrew) Lee
(74) *Attorney, Agent, or Firm*—Carlson, Caspers Vandenburgh & Lindquist (57) ABSTRACT

An interferometer uses birefringent elements for splitting and combining beams of orthogonal polarization, and for changing the relative phase between the orthogonally polarized beams. A polarization sensitive detector is used to detect a fringe pattern whose periodicity is dependent on the relative optical paths traversed by the orthogonally polarized beams. In an embodiment of the invention, a birefringent beam splitter has an input path and first and second output paths. A birefringent beam combiner has first and second input paths and an output path, the first and second input paths of the birefringent beam combiner aligned respectively with the first and second output paths of the birefringent beam splitter. A polarization sensitive detector is disposed on the output path of the birefringent beam combiner to detect the periodicity of the fringe pattern.

18 Claims, 5 Drawing Sheets

BIREFRINGENT MACH-ZEHNDER INTERFEROMETER

FIELD OF THE INVENTION

The present invention is directed generally to optical interferometers, and more particularly to optical interferometers based on the use of birefringent components.

BACKGROUND

Interferometers are useful for measuring optical properties of materials, such as the refractive index. Some interferometers include a large number of reflectors, which can be bulky and difficult to maintain in alignment. For example, a conventional Mach Zehnder interferometer includes a light source, a beamsplitter, two steering mirrors, a second beamsplitter that operates as a beam combiner, and a detector.

Therefore, there is a need for an interferometer that is easy to maintain in alignment and can be made to be compact.

SUMMARY OF THE INVENTION

Generally, the present invention relates to an interferometer that uses birefringent elements for splitting and combining beams of orthogonal polarization, and for changing the relative phase between the orthogonally polarized beams. A polarization sensitive detector is used to detect a fringe pattern whose periodicity is dependent on the relative optical paths traversed by the orthogonally polarized beams.

One particular embodiment of the invention is a birefringent interferometer for use with a polarized input light beam. The interferometer includes a first birefringent element oriented to split the polarized input light beam into an ordinary beam and an extraordinary beam and a second birefringent element oriented to combine the ordinary beam and the extraordinary beam into an output beam. A polarization sensitive detector unit is disposed to detect a selected polarization of the output beam.

Another embodiment of the invention is an interferometer that includes polarization beam splitting means for splitting an incoming polarized light beam into first and second light beams of orthogonal polarization and polarization beam combining means for combining the first and second light beams of orthogonal polarization into an output beam. The interferometer also includes polarization sensitive detection means for detecting polarization of the output beam and wavelength selection means for selecting a wavelength of light detected by the polarization sensitive detection means.

Another embodiment of the invention is a polarization interferometer that includes a birefringent beam splitter having an input path and first and second output paths and a birefringent beam combiner having first and second input paths and an output path, the first and second input paths of the birefringent beam combiner aligned respectively with the first and second output paths of the birefringent beam splitter. A polarization sensitive detector is disposed on the output path of the birefringent beam combiner.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In general, the present invention is directed to a polarization interferometer based on the use of birefringent optical crystals. The polarization interferometer is referred to as a polarization Mach-Zehnder interferometer (PMZI). The invention finds application in many index or optical path related components and sub-systems, including, but not limited to, refractive index measurements, thermal effect measurements, electrical/magnetic induced index measurement, frequency locker devices, and distance measurements.

Figure 1:
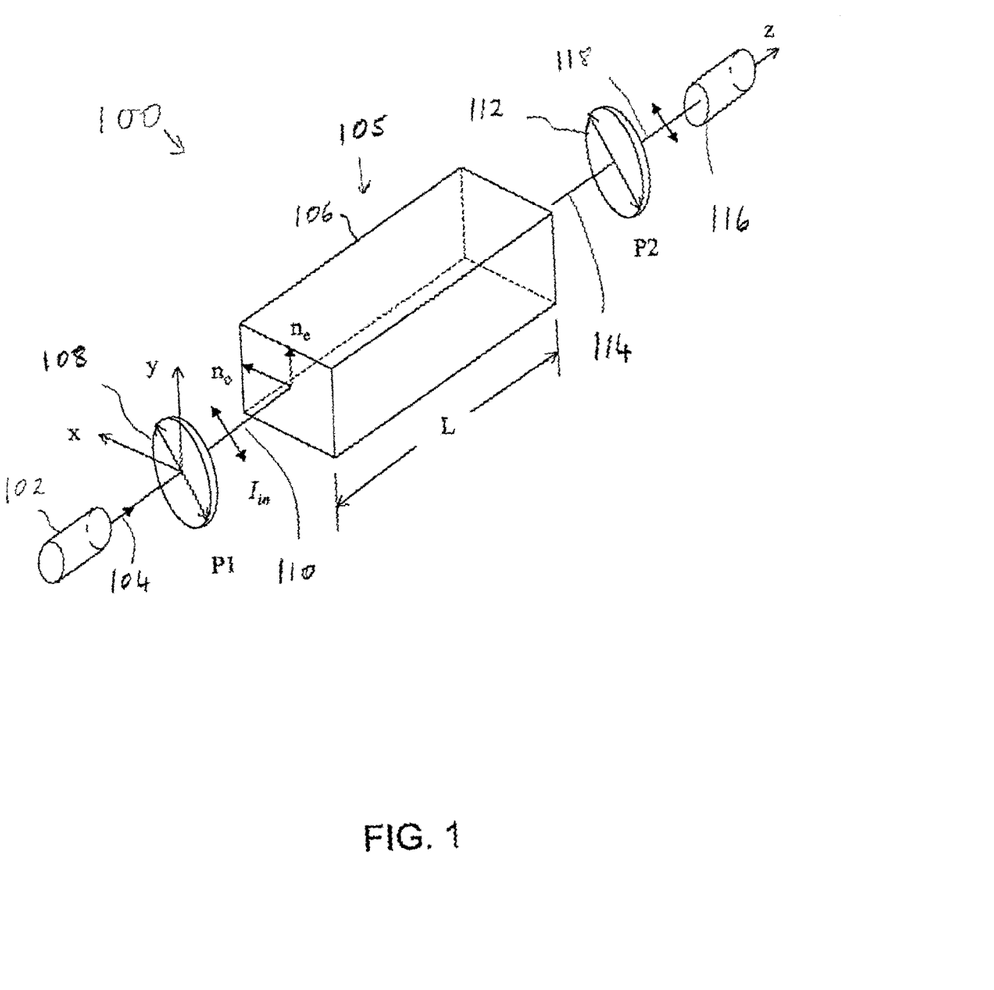
FIG. 1 schematically illustrates an operational principle of the polarization interferometer according to the present invention.

One of the operational principles of the PMZI is described with reference to the optical system 100 schematically illustrated in FIG. 1. A light source 102 generates an output beam 104 that is directed to a birefringent polarization rotation unit 105. In this particular embodiment, the birefringent polarization unit 105 includes a birefringent crystal 106. The light source 102 may generate the output beam 104 as a polarized beam or as an unpolarized beam. A polarizer 108 may be placed between the light source 102 and the birefringent crystal 106 to polarize the light beam 104 if it is generated unpolarized, or to clean up the polarization of the light beam if it is generated as a polarized beam.

The light beam 110 passing into the birefringent crystal 106 is polarized, preferably with its polarization direction at approximately 45° to the fast axis and the slow axis of the birefringent crystal 106. The birefringent crystal 106 has a length, L, and a birefringence $\Delta n = |n_e - n_o|$, where $n_e$ is the refractive index for an extraordinary ray and $n_o$ is the refractive index for an ordinary ray. In this description, we assume that the crystal 106 displays positive birefringence, with $n_e$ larger than $n_o$, although it will be appreciated that the birefringent crystal 106 may also display negative birefringence, with $n_o$ larger than $n_e$. It will be appreciated that biaxial crystals may also be employed.

A polarizer 112 is set to polarize the light beam 114 output from the birefringent crystal 106. The polarizer 112 is preferably oriented parallel to the input polarizer 108. A detector 116 detects the light passed through the polarizer 112.

The transmittance through the optical system 100 is given by the following expression:

$$T = I_{out}/I_{in} = \cos^2[\pi(n_e - n_o)L/\lambda] \tag{1}$$

where $I_{out}$ and $I_{in}$ are the intensities in the analyzed output beam 118 and the input beam 110, and $\lambda$ is the wavelength of the light.

The condition of the maximum transmittance through the optical system 100 is given by the expression:

$$L\Delta n = m\lambda, m = 0,1,2, \tag{2}$$

Thus, maximum transmittance through the optical system corresponds to the difference in optical path length between the ordinary and extraordinary rays through the crystal 106 being an integral number of wavelengths.

The light source 102 is typically capable of emitting light over a broad range of wavelengths. The light source 102 may include, for example, a tunable laser or a broadband light emitter, such as a light emitting diode (LED), halogen lamp, or the like, whose output is collimated through a fiber or through a lens.

The light may be delivered from the light source 102 to the birefringent polarization rotating unit 105 via an optical fiber terminated with a collimating lens to create a collimated beam that passes through the birefringent polarization rotating unit 105. Likewise, the light may be delivered from the birefringent polarization rotating unit 105 to the detector 116 via an optical fiber, where a focusing lens focuses the light from the birefringent polarization rotating unit 105 into the fiber.

Figure 2:
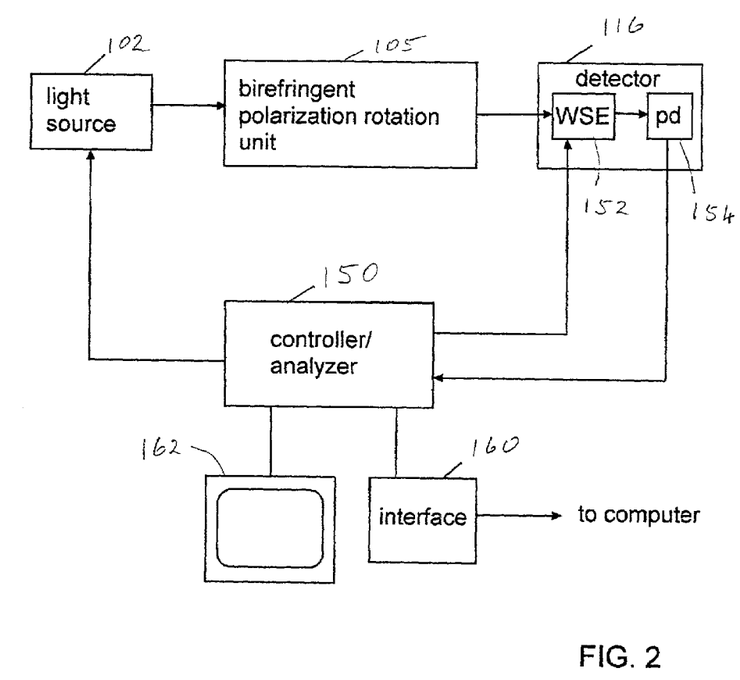
FIG. 2 schematically illustrates an arrangement for controlling a polarization interferometer according to the present invention.

The system 100 may include the ability to select the wavelength of light that is detected, in order to obtain a wavelength-dependent signal from the detector 116, as is further explained in FIG. 2. For example, the light source 102 may generate a single wavelength at any one time, but be tunable over a range of wavelengths. Examples of such a light source include a tunable laser such as a tunable semiconductor laser, or a broadband source whose output is passed through a light disperser, such as a grating or prism, and a narrow band of the broadband light selected, for example using a slit, as the output from the light source. The tunable light source 102 may be controlled by a controller/analyzer 150, which tunes the wavelength of the output from the light source 102.

In another embodiment, the detector 116 may include a wavelength selective element (WSE) 152 that directs light to a photodetector 154 (pd). The WSE 152 may direct only a narrow range of wavelengths to a single channel photodetector 154. The photodetector 154 may be, for example, a photodiode, an avalanche photodiode, a phototransistor, a charge coupled device (CCD), a photomultiplier or the like. For example, the wavelength selective element may be a diffraction grating, a prism, a filter, or any other suitable optical element that manifests wavelength dispersion so as to separate light of different wavelengths. The WSE 152 may be positioned either before or after the polarizer 112 to provide wavelength separation. The wavelength transmitted by the WSE 152 to the photodetector 154 may be controlled by the controller/analyzer 150. For example, the controller/analyzer may control the transmission wavelength of the WSE to sweep over a particular wavelength range, and may also control the sweep rate.

In another embodiment, the WSE 152 may disperse a large portion, if not all, of the light incident thereon from the light source 102 to a multi-channel photodetector 154, such as a photodiode or CCD array, so that the detector 116 measures the transmittance through the system 100 over multiple wavelengths in a single measurement.

The output from the photodetector 154 is transmitted to the controller/analyzer 150 for signal amplification and analysis. The controller analyzer may be a computer, such as a PC compatible type computer, or other type of computer, operating with appropriate software to analyze the data received from the photodetector 154 and/or to control the operating wavelength of the light source 102 and/or the WSE 152. The data analyzed by the controller/analyzer may be transmitted via an interface unit 160 to an external computer or may be displayed on an attached display device 162, such as a monitor or printer. Furthermore, the controller/analyzer 150 may receive control instructions from an external computer connected via the interface unit 160.

It will be appreciated that the detector 116 need only produce signals that correspond to different wavelengths, and need not include all the features just described for controlling the detected wavelength. For example, if the light source 102 directs broadband light through the birefringent polarization rotation unit 105, then the controller/analyzer 150 need not control either the light source 112 or the WSE 152 if the photodetector 154 is a multiple channel detector, although such control need not be excluded. Furthermore, if the light source 102 is a tunable light source, then the WSE 152 need not be present, although it may be included for increased wavelength sensitivity. Likewise, where the light source 102 is a tunable light source, the photodetector 154 may be a single channel detector if there is no WSE 152 present, or may be a multiple channel detector if a WSE 152 is present. It will be appreciated that several different configurations of light source 102 and detector 116 may be used.

Figure 3:
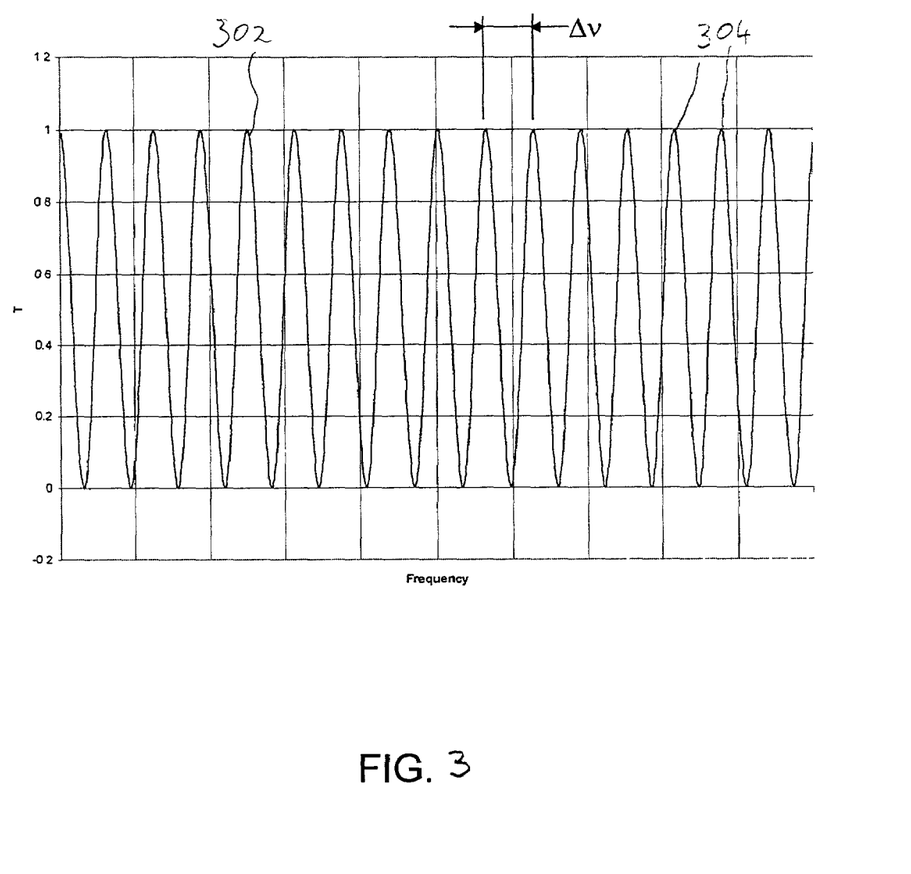
FIG. 3 illustrates a plot of light transmitted through the polarization interferometer of FIG. 1 as a function of frequency.

A typical transmission signal detected by the detector is illustrated in FIG. 3. The signal 302 includes a series of uniformly spaced peaks 304. The frequency separation between the peaks, $\Delta v$, is given by the expression:

$$\Delta v = c/(L\Delta n) \tag{3}$$

where c is the speed of light in vacuum.

It will be appreciated that the valleys in the recorded signal may not reach zero intensity if the optical intensity in the ordinary and extraordinary rays is not equal. Thus, it is advantageous for maximum signal contrast that the polarization of the beam 100 input to the crystal 106 be at around 45° in order to excite the ordinary and extraordinary rays equally.

Figure 4:
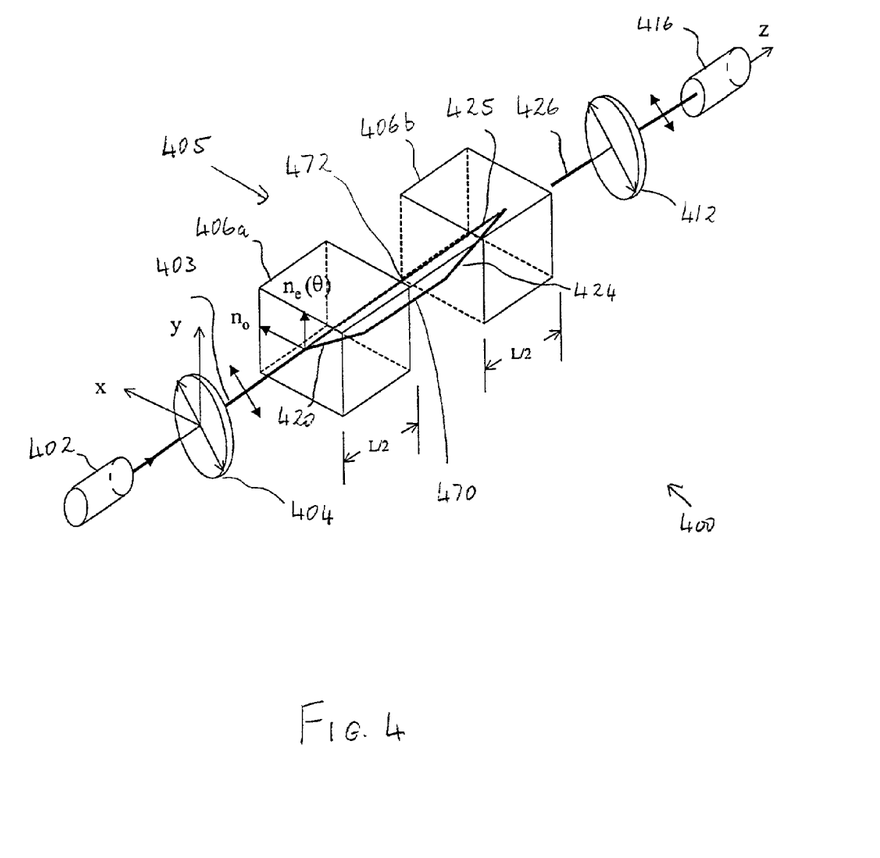
FIG. 4 schematically illustrates an embodiment of a polarization interferometer according to the present invention.

The frequency spacing of the PMZI output signal reflects the path difference between the e-ray and the o-ray. An important issue is how the o-ray and e-ray are dealt with in the birefringent polarization rotation unit 105. Another embodiment 400 of the PMZI is illustrated in FIG. 4. A light source 402 directs light through a polarizer 404 to a birefringent polarization rotation unit 405. The light from the birefringent polarization rotation unit 405 is directed through an analyzing polarizer 412 to a detector 416.

The birefringent polarization rotation unit 405 includes two birefringent optical crystals 406a and 406b separated by a certain distance. The optical axes of the first and second crystals 406a and 406b are in the y-z plane. In this embodiment, the optical axis of the first crystal 406a is also set at +θ relative to the z-direction in the y-z plane. Conversely, the optical axis of the second crystal 406b set at −θ relative to the z-direction in the y-z plane. The transmittance through the PMZI 400 may be expressed as:

$$T = \frac{I_{out}}{I_{in}} = \cos^2\left[\pi\left(\frac{n_e(\theta)}{\cos\alpha} - n_o\right)L/\lambda\right] \quad (4)$$

where each crystal 406a and 406b has a length of L/2, the extraordinary refractive index is $n_e(\theta)$, and the birefringent walk-off angle is α.

The frequency spacing, Δv, of the detected spectrum is given by the following expression;

$$\Delta v = \frac{c}{L\left(\frac{n_e(\theta)}{\cos\alpha} - n_o\right)} \quad (5)$$

It will be appreciated that the optical axis of the first crystal 406a may be oriented at −θ relative to the z-direction while the optical axis of the second crystal 406b is oriented at +θ relative to the z-direction. It will also be appreciated that the two crystals need not be formed of the same material, in which case expressions (4) and (5) would need to be modified to account for the different refractive indices of the two materials. The following description assumes that the two crystals 406a and 406b are formed of the same material.

The input beam 403 is split into two beams, first and second polarized beams 470 and 472 in the first crystal 406a. The polarization state of the first polarized beam 470 is orthogonal to the polarization state of the second polarized beam 472. The two polarized beams 470 and 472 are recombined in the second crystal 406b. The splitting and combining of the two beams 470 and 472 is a result of tilting the optical axes of the crystals relative to the z-direction.

In the first crystal 406a, the first polarized beam 470 is an extraordinary beam 420 that walks off from the second polarized beam 472. In the first crystal 406a, the second polarized beam 472 is an ordinary beam 422. The extraordinary beam 420 is preferably spatially separated from the ordinary beam 422 upon exiting the first crystal 406a so that the first and second polarized beams 470 and 472 have no spatial overlap in the gap between the two crystals 406a and 406b. This requires the designer to select the length of the first crystal 406a based on the required walk-off distance and the walk-off-angle of the crystal 406a.

The first polarized beam 470 enters the second crystal 406b as an extraordinary ray 424 and the second polarized beam 472 enters the second crystal 406b as an ordinary ray 425. The length of the second crystal 406b is selected so that the first and second polarized beams 470 and 472 combine at the output face of the second crystal 406b to produce a single output beam 426.

Figure 5:
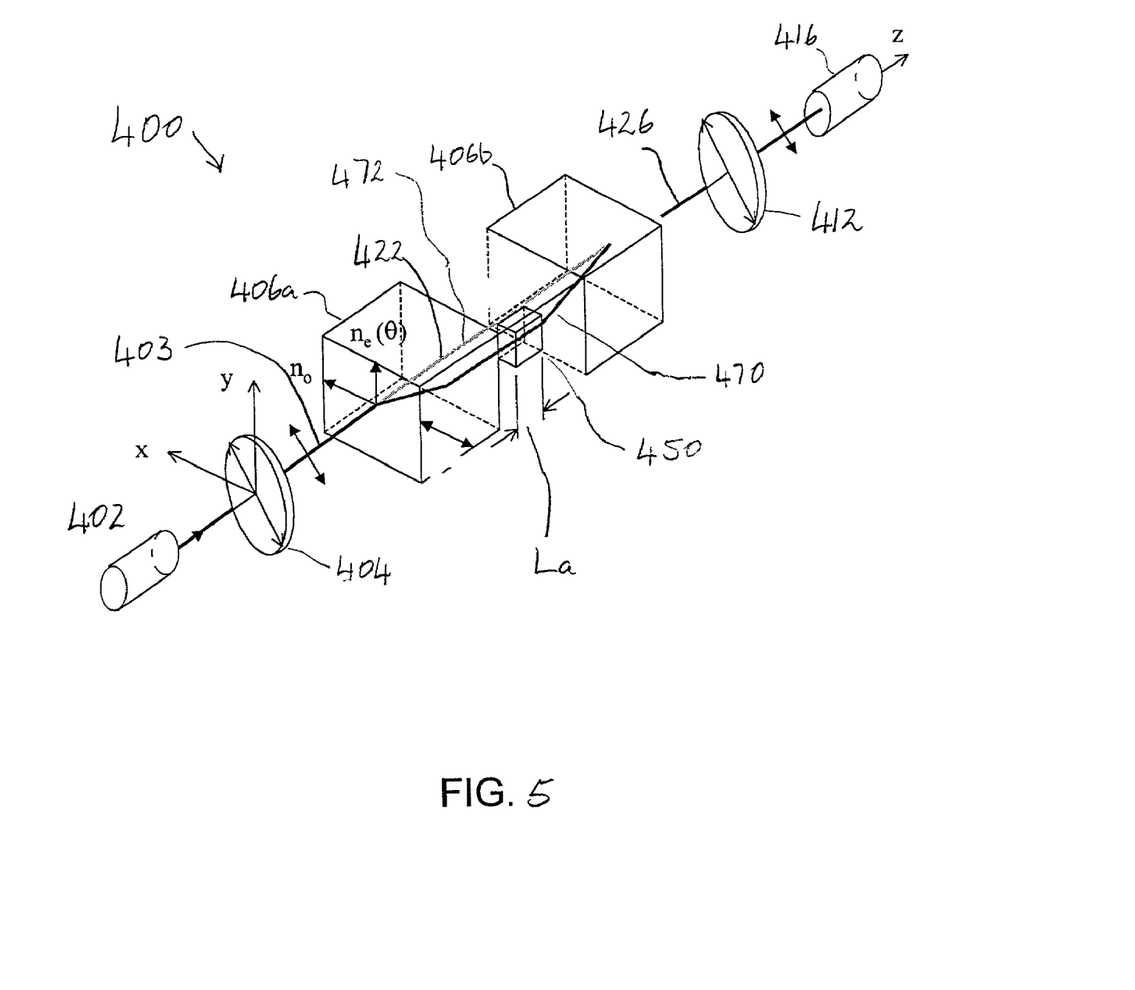
FIG. 5 schematically illustrates another embodiment of a polarization interferometer according to the present invention.

A sample of optical material 450 may be inserted into the path of one of the polarized beams 470 and 472, at the gap between the two crystals 406a and 406b. FIG. 5 illustrates the sample 450 inserted in the path of the extraordinary ray from the first crystal 406a. The sample 450 changes the path length difference between the optical paths of the two polarized beams 470 and 472 before they are recombined in the second crystal 406b. This results in a change in the frequency spacing of the transmission spectrum. Hence, the frequency spacing of the transmission spectrum when the sample 450 is inserted between the crystals 406a and 406b, $\Delta v_a$, is given by the expression:

$$\Delta v_a = \frac{c}{L\left(\frac{n_e(\theta)}{\cos\alpha} - n_o\right) + L_a(n_a - 1)} \quad (6)$$

where $n_a$ is the refractive index of the optical material 450 for the polarization of the light passing through the sample 450, and $L_a$ is the physical length of the sample 450 through which the first polarized beam 470 passes. It will be appreciated that this expression assumes that the region between the crystals 406a and 406b contains a vacuum, air, or other gas having a refractive index close to 1. If the region between the crystals contains some other material having, for example, a refractive index of $n_m$, then the term $(n_a-1)$ in expression (6) would be replaced by $(n_a-n_m)$.

Subtracting expression (6) from expression (5) yields an expression for the refractive index of the optical material 450:

$$n_a = 1 - c[1/\Delta v - 1/\Delta v_a]/L_a \quad (7)$$

Thus, the refractive index of a piece of material may be determined by measuring the frequency spacing of the transmission spectrum before and after insertion of the piece of optical material. The optical material used to form the sample 450 measured may be a transparent solid, such as a glass or crystal, a liquid or a gas. Liquids and gases are preferably measured in a calibrated cell. The cell may be calibrated by first measuring the path length difference introduced as by the empty cell empty, before filling the cell with the material to be measured in the PMZI.

An advantage of the polarization interferometer over other types of interferometer is that each beam contains polarized light, so the refractive indices of birefringent materials may be measured directly. The PMZI may also be used to measure refractive index changes induced by external effects, such as electrical, magnetic, radiation, thermal, acoustic or pressure effects. The transmission spectrum through the PMZI may be recorded before and after the change in the external effect. The index change, Ana, is given by the expression:

$$\Delta n_a = c[1/\Delta v_1 - 1/\Delta v_2]/L_a \quad (8)$$

where $\Delta v_1$ is the frequency spacing before the effect change and $\Delta v_2$ is the frequency spacing measured after the effect change.

Figure 6:
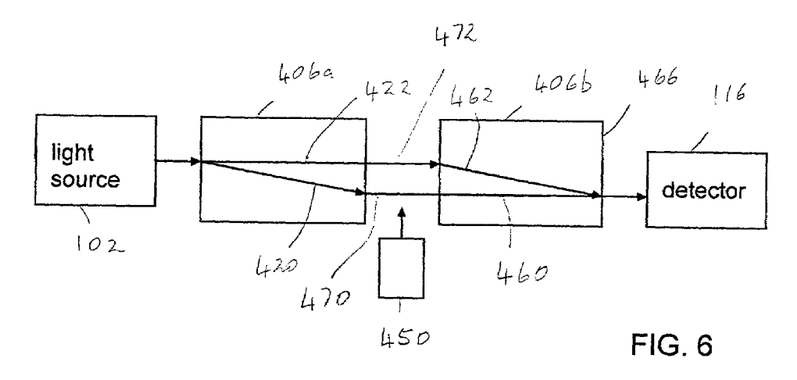
FIG. 6 schematically illustrates another embodiment of polarization interferometer according to the present invention.

It will be appreciated that the second crystal 406b may have its optic axis directed at the same angle, θ, towards the z-direction in the y-z plane as the first crystal 406a, for example as illustrated in FIG. 6. The second crystal is also oriented so that the first interferometer beam 470, which is an extraordinary beam 420 in the first crystal 406a enters the second crystal 406b as an ordinary beam 460. Also, the second interferometer beam 472, which is an ordinary beam 422 in the first crystal 406a, enters the second crystal 406b as an extraordinary beam 462. The extraordinary beam 462 is deviated by the walk-off effect towards the ordinary beam 460. Therefore, the first and second interferometer beams 470 and 472 are combined at the exit face 466 of the second crystal 406b.

In such an embodiment, the optical path difference between the two interferometer beams 470 and 472 is zero, or close to zero, when there is no material 450 positioned between the crystals, in which case the frequency separation of the transmission peaks is infinite, if not extremely large. However, the introduction of the sample of optical material 450 into one of the beams introduces a path length difference between the two beams 470 and 472, producing a measurable peak separation. Since the frequency separation of the peaks without the optical material present is known to be infinite, in other words $1/\Delta v$ is zero, this arrangement permits the refractive index of the optical material 450 to be determined from expression (7) using only a single measurement, that is a measurement of $\Delta v_a$.

Any suitable birefringent material may be used for the birefringent crystals 406a and 406b. Yttrium orthovanadate, $YVO_4$, is a particularly useful material, since its large birefringence permits the crystals 406a and 406b to have a large walk-off angle, and so the two beams 420 and 422 are spatially separated in a relatively small length of material. However, other materials may also be used, including, for example, lithium niobate, barium borate, rutile and calcite.

As noted above, the present invention is applicable to optical systems and is believed to be particularly useful for providing a compact polarization interferometer that may be used for measuring refractive indices and changes in refractive index. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An interferometer, comprising:
birefringent polarization beam splitting means for splitting an incoming polarized light beam into first and second light beams of orthogonal polarization;
birefringent polarization beam combining means for combining the first and second light beams of orthogonal polarization into an output beam, polarization states of the first and second light beams being maintained between the polarization beam splitting means and the polarization combining means;
polarization sensitive detection means for detecting polarization of the output beam; and
wavelength selection means for selecting a wavelength of light detected by the polarization sensitive detection means.

2. An interferometer as recited in claim 1, further comprising polarized light emitting means for emitting a polarized light beam as an input to the polarization splitting means.

3. A polarization interferometer, comprising:
a birefringent beam splitter having an input path and first and second output paths;
a birefringent beam combiner having first and second input paths and an output path, the first and second input paths of the birefringent beam combiner aligned respectively with the first and second output paths of the birefringent beam splitter, polarization states of light propagating along the first and second output paths respectively from the birefringent beamsplitter to the birefringent beam combiner remaining unchanged between the birefringent beamsplitter and the birefringent beam combiner; and
a polarization sensitive detector disposed on the output path of the birefringent beam combiner.

4. A polarization interferometer as recited in claim 3, further comprising a polarized light source that transmits a polarized light beam along the input path of the birefringent beam splitter.

5. A polarization interferometer as recited in claim 4, wherein the polarized light source includes a generator of a polarized light beam.

6. A polarization interferometer as recited in claim 4, wherein the polarized light source includes a generator of an unpolarized light beam on the input path to the birefringent beam splitter and a polarizer positioned on the unpolarized light beam between the generator and the birefringent beam splitter.

7. A polarization interferometer as recited in claim 4, wherein the polarized light source is a tunable light source and further comprising a controller to control an operational wavelength of the tunable light source.

8. A polarization interferometer as recited in claim 3, wherein the polarization sensitive detector includes a photodetector disposed on the output path from the birefringent beam combiner and a polarizer disposed on the output beam path from the birefringent beam combiner between the birefringent beam combiner and the photodetector.

9. A polarization interferometer as recited in claim 8, wherein the polarization sensitive detector further includes a light dispersing unit disposed between the birefringent beam combiner and the photodetector.

10. A polarization interferometer as recited in claim 9, wherein the light dispersing unit includes a movable dispersing element, and further comprising a controller coupled to the light dispersing unit to control a position of the moveable dispersing element.

11. A polarization interferometer as recited in claim 10, further comprising an interface unit connected to the controller and couplable to a computer, the controller capable of operating under control instructions received from a computer coupled via the interface unit.

12. A polarization interferometer as recited in claim 9, wherein the photodetector is a multiple channel photodetector disposed to detect multiple wavelengths of light dispersed by the light dispersing unit.

13. A polarization interferometer as recited in claim 3, further comprising a data analysis unit coupled to the polarization sensitive detector to analyze an output signal from the polarization sensitive detector.

14. A polarization interferometer as recited in claim 13, further comprising a data display unit coupled to the data analysis unit to display data analyzed by the data analysis unit.

15. A polarization interferometer as recited in claim 13, further comprising an interface coupled to the data analysis unit to interface to a computer.

16. A polarization interferometer as recited in claim 3, wherein light propagating along the first output path from the birefringent beam splitter is an ordinary ray in the birefringent beam splitter and an extraordinary ray in the birefringent beam combiner and light propagating along the second output path from the birefringent beam splitter is an extraordinary ray in the birefringent beam splitter and an ordinary ray in the birefringent beam combiner.

17. A polarization interferometer as recited in claim 3, wherein light propagating along the first output path from the birefringent beam splitter is an extraordinary ray in the birefringent beam splitter and an extraordinary ray in the birefringent beam combiner and light propagating along the second output path from the birefringent beam splitter is an ordinary ray in the birefringent beam splitter and an ordinary ray in the birefringent beam combiner.

18. A polarization interferometer as recited in claim 3, wherein the birefringent beam splitter and the birefringent beam combiner each comprise a single birefringent crystal.

* * * * *